(12) United States Patent
Yoritsune

(10) Patent No.: US 8,419,509 B2
(45) Date of Patent: Apr. 16, 2013

(54) SWIVEL DEVICE AND GRINDING MACHINE INCORPORATING THE SAME

(75) Inventor: Masashi Yoritsune, Anjo (JP)

(73) Assignee: JTEKT Corporation, Osaka-shi (JP)

( * ) Notice: Subject to any disclaimer, the term of this patent is extended or adjusted under 35 U.S.C. 154(b) by 1013 days.

(21) Appl. No.: 12/245,099

(22) Filed: Oct. 3, 2008

(65) Prior Publication Data

US 2009/0111365 A1 Apr. 30, 2009

(30) Foreign Application Priority Data

Oct. 24, 2007 (JP) ................................. 2007-276508

(51) Int. Cl.
*B24B 7/00* (2006.01)
(52) U.S. Cl.
USPC ............ 451/65; 451/124; 451/137; 451/242; 451/246
(58) Field of Classification Search .................... 451/49, 451/65, 124, 137, 242, 246, 249, 251
See application file for complete search history.

(56) References Cited

U.S. PATENT DOCUMENTS

| | | | |
|---|---|---|---|
| 6,283,837 B1 * | 9/2001 | Vorbuchner | 451/58 |
| 6,878,043 B1 * | 4/2005 | Junker | 451/49 |
| 6,923,713 B2 * | 8/2005 | Yoshimi et al. | 451/236 |
| 7,341,501 B2 * | 3/2008 | Yanase et al. | 451/5 |
| 2003/0186631 A1 * | 10/2003 | Yoshimi et al. | 451/127 |
| 2005/0064800 A1 * | 3/2005 | Yoshimi et al. | 451/246 |
| 2010/0048104 A1 * | 2/2010 | Junker | 451/49 |

FOREIGN PATENT DOCUMENTS

| | | | |
|---|---|---|---|
| EP | 416258 A1 * | 3/1991 | |
| EP | 1 155 780 A2 | 11/2001 | |
| JP | 03049866 A * | 3/1991 | |
| JP | 2000-108026 | 4/2000 | |
| WO | WO 2004/069472 A1 | 8/2004 | |

OTHER PUBLICATIONS

Notice of Rejection Reasons issued Jul. 24, 2012 in Japanese Patent Application No. 2007-276508 (with English translation).

* cited by examiner

*Primary Examiner* — Eileen P. Morgan
(74) *Attorney, Agent, or Firm* — Oblon, Spivak, McClelland, Maier & Neustadt, L.L.P.

(57) ABSTRACT

In a swivel device, a swivel head provided with a plurality of tool spindles thereon is mounted on a support base to be turnable about a swivel shaft being upright on the support base. An annular space portion is formed between the support base and the swivel head in coaxial relation with the swivel shaft. The tool spindles each mounting a grinding wheel are arranged on the swivel head to extends in a horizontal plane which crosses the annular space portion at about a mid position in the vertical direction of the annular space portion. A direct drive motor is built in the annular space portion so that a driving center of the direct drive motor is at almost the same height as the horizontal plane including the axes of the grinding wheels. Thus, the swivel device can lower the positions of the rotational axes of the grinding wheels and is rigid against inclination caused by grinding resistance acting on the grinding wheels.

5 Claims, 3 Drawing Sheets

SWIVEL DEVICE AND GRINDING MACHINE INCORPORATING THE SAME

INCORPORATION BY REFERENCE

This application is based on and claims priority under 35 U.S.C. 119 with respect to Japanese patent application No. 2007-276508 filed on Oct. 24, 2007, the entire content of which is incorporated herein by reference.

BACKGROUND OF THE INVENTION

1. Field of the Invention

The present invention relates to a swivel device in which a swivel head having a plurality of tool spindles is provided to be turnable, and also to a grinding machine incorporating the swivel device therein.

2. Discussion of the Related Art

As described in Japanese unexamined, published patent application No. 2000-108026 for example, there has been known a process-intensive cylindrical grinding machine, wherein a wheel head (swivel head) with a plurality of wheel spindles each supporting a grinding wheel is provided to be turnable and wherein the wheel head is selectively turned by a swiveling mechanism to predetermined angular positions so that various kinds of grindings can be performed on a workpiece by the selective use of the grinding wheels.

In the known cylindrical grinding machine described in the Japanese application, one wheel spindle has a straight grinding wheel (G1) at one end thereof and also has an angular grinding wheel (G2) at the other end thereof. For a grinding operation with the straight grinding wheel, the wheel head is turned a predetermined angle about a center shaft (13) to bring the one wheel spindle in parallel relation to a traverse feed direction of a work table. For another grinding operation with the angular grinding wheel, on the other hand, the wheel head is turned another predetermined angle about the center shaft to bring the generatrix of a grinding surface facing a workpiece of the angular grinding wheel into parallel relation to the traverse feed direction of the work table.

In the cylindrical grinding machine of this kind, a swivel drive unit composed of a worm and worm-wheel mechanism for turning the wheel head and a positioning and fixing unit composed of a curved-gear coupling for positioning the wheel head to a designed angular position are arranged to be spaced long therebetween in the vertical direction (the swivel axis direction) of the wheel head. This unavoidably causes the position of the wheel spindle to go far away in the vertical direction from the top surface of a bed of the grinding machine and hence, gives rise to a problem that the wheel head is lowered in rigidity against a rotational moment and is liable to be inclined by the grinding resistance.

SUMMARY OF THE INVENTION

It is therefore an object of the present invention to provide an improved swivel device and a cylindrical grinding machine incorporating the swivel device wherein the positions of wheel spindles can be lowered so that the swivel head becomes rigid against the inclination caused by the grinding resistance.

Briefly, according to the present invention, there is provided an improved swivel device for a machine tool, and the swivel device comprises a support base; a swivel head arranged on the swivel base to be turnable about a swivel shaft and having a plurality of tool spindles arranged thereon in a plane perpendicular to the axis of the swivel shaft; an annular space portion formed between the support base and the swivel head in coaxial relation with the swivel shaft and crossing the plane at about a mid portion thereof in the axial direction; and a direct drive motor built in the annular space portion for driving the swivel head to turn about the swivel shaft.

With this construction, since the annular space portion between the support base and the swivel head is formed to cross the plane at about the axial mid portion thereof, and since the direct drive motor for driving the swivel head is built in the annular space portion, the height of the swivel head from the support base can be suppressed, so that the swivel head can be restrained from being inclined by the machining reaction force which is generated during a machining operation with a tool on each tool spindle.

According to a second aspect of the present invention, there is provided a grinding machine, which comprises a bed; a work table horizontally movable on the bad in a first direction; a workpiece drive and support mechanism mounted on the work table for supporting a workpiece to be rotatable about an axis extending in the first direction; a first feed mechanism for feeding the work table on the bed in the first direction; a grinding wheel table horizontally movable on the bed in a second direction intersecting with the first direction; and a second feed mechanism for feeding the grinding wheel table in the second direction. The grinding machine further comprises the swivel device of the character set forth above, which is mounted on the grinding wheel table with the support base fixed on the grinding wheel table and with the swivel shaft extending vertically so that the swivel head is horizontally turnable about the swivel shaft; and first and second wheel spindle support mechanisms provided on a first and second side surfaces of the swivel head and respectively supporting the tool spindles with first and second grinding wheels mounted thereon being rotatable about respective axes thereof in the plane perpendicular to the axis of the swivel shaft.

With this construction, since the swivel device of the character set forth above is mounted on the grinding wheel table with the support base fixed on the grinding wheel table and with the swivel shaft extending vertically, the grinding machine can have the effects as attained by the swivel device of the character set forth above. Thus, in the grinding machine, the swivel head is rigid against grinding resistance to be hardly inclined, so that the grinding accuracy of the workpiece can be enhanced.

BRIEF DESCRIPTION OF THE DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
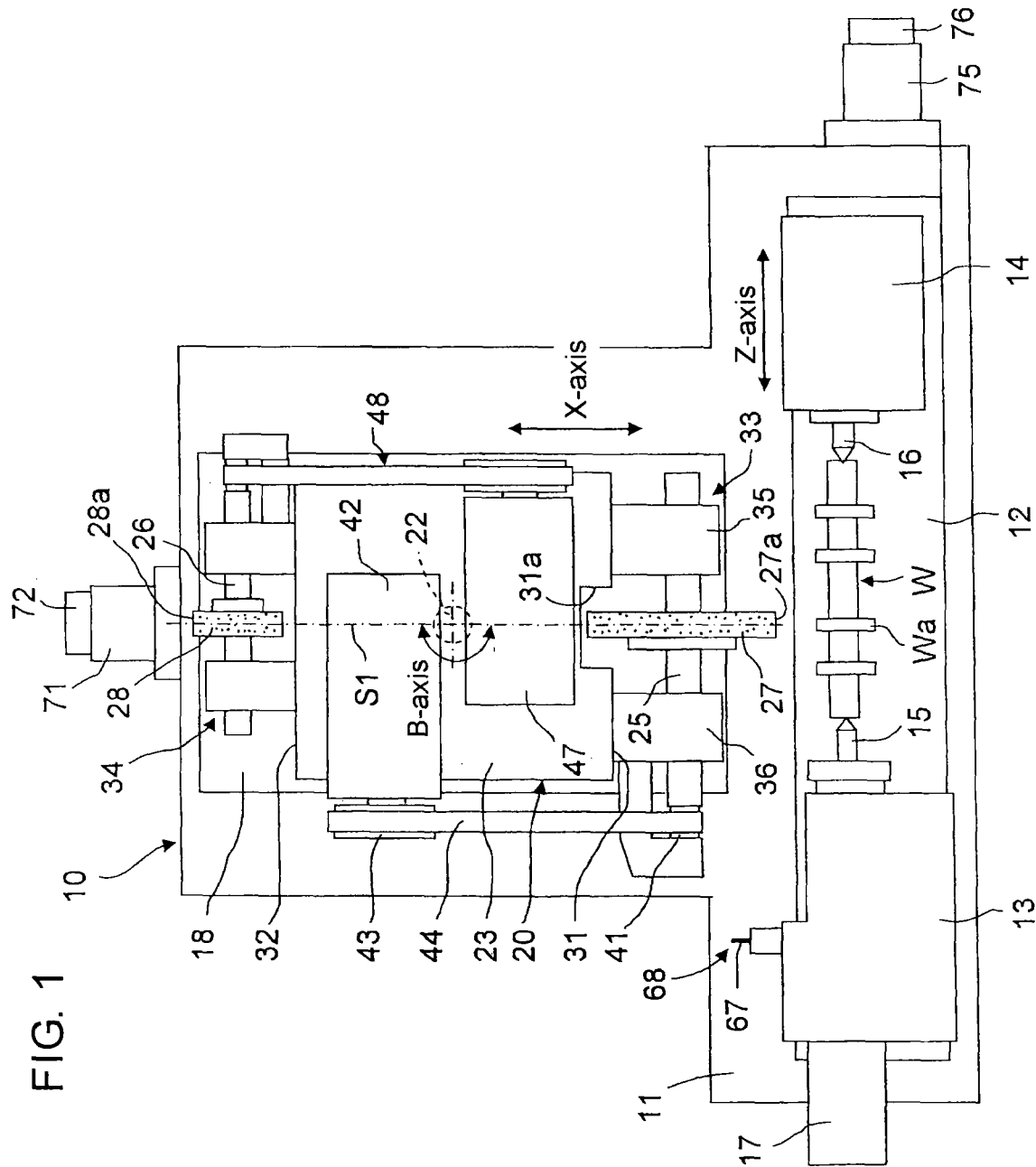
FIG. 1 is a plan view of a cylindrical grinding machine incorporating a swivel device in one embodiment according to the present invention.

Hereafter, a cylindrical grinding machine incorporating a swivel device in one embodiment according to the present invention will be described in detail with reference to the accompanying drawings. Referring now to FIG. 1, therein is shown a schematic construction of the cylindrical grinding machine 10. On a bed 11 of the cylindrical grinding machine 10, a work table 12 is supported to be movably guided in a horizontal Z-axis direction and is movable by a Z-axis servomotor 75 in a Z-axis direction. On the work table 12, a work head 13 and a foot stock 14 which constitute a workpiece support and drive mechanism are arranged to face with each other, and the work head 13 and the foot stock 14 are respectively provided with centers 15, 16 for supporting opposite ends of a workpiece W. The workpiece W supported by the both centers 15, 16 is driven by a work spindle drive motor 17, mounted on the work head 13, through a driving member (not shown) to be rotated about an axis parallel to the moving direction (the Z-axis direction) of the work table 12.

Further, the bed 11 supports thereon and guides a grinding wheel base or table 18 to be movable in a horizontal X-axis direction perpendicular to the moving direction of the workpiece table 12. The grinding wheel table 18 is movable by an X-axis servomotor 71 back and forth in the X-axis direction. A grinding wheel swivel device 20 is mounted on the grinding wheel table 18.

Figure 2:
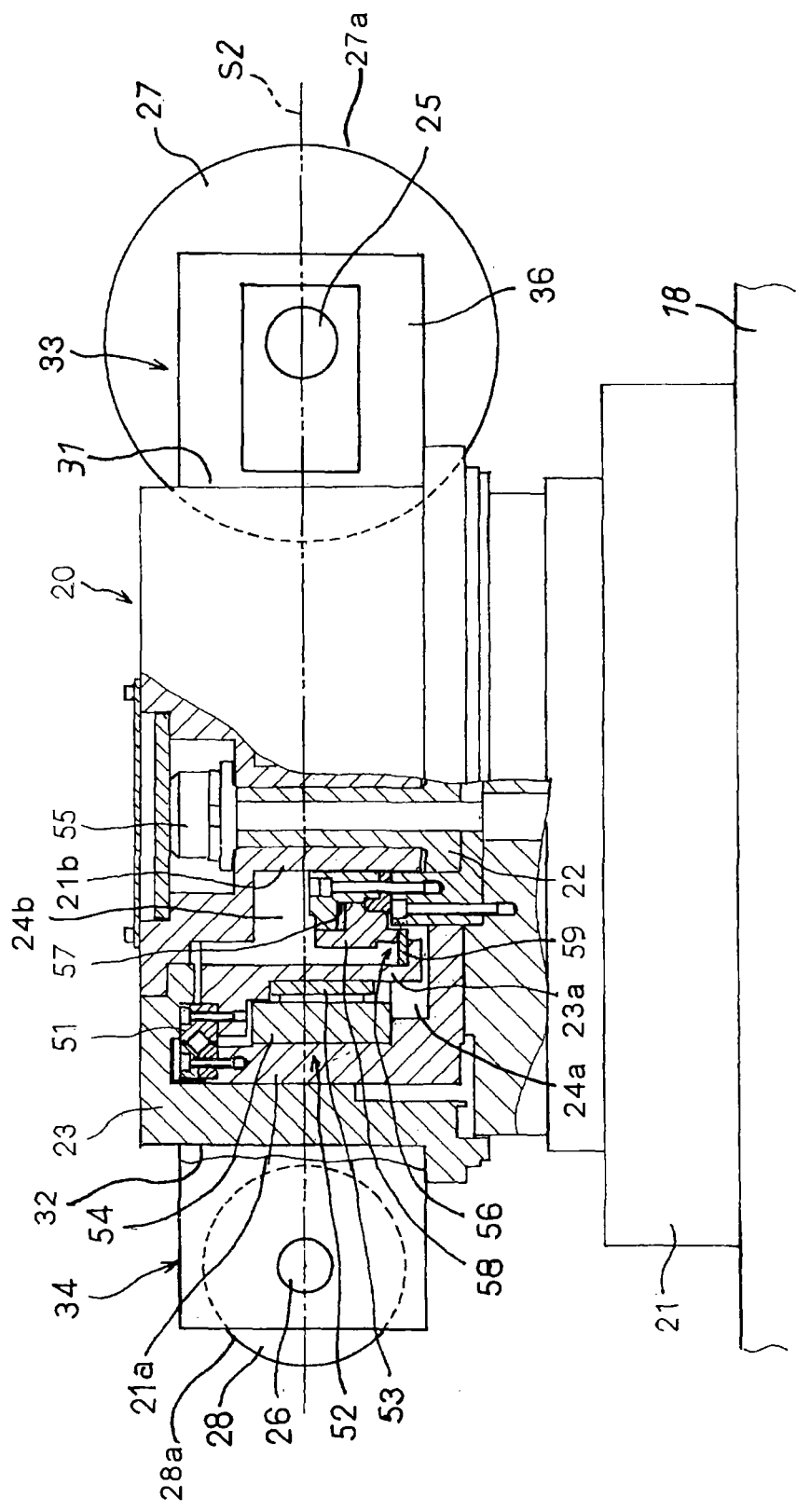
FIG. 2 is a side view partly in section of the swivel device.

As shown in FIG. 2, the grinding wheel swivel device 20 has a support base 21 fixed on the grinding wheel table 18 and a swivel head 23 which is supported on the support base 21 to be turnable about a vertically extending B-axis (refer to FIG. 1), that is, the axis of a swivel shaft 22. The swivel head 23 supports a plurality (two in this particular embodiment) of wheel spindles 25 and 26, which are respectively rotatable about mutually parallel horizontal axes. Two cylindrical grinding wheels 27 and 28 are respectively mounted on the wheel spindle 25, 26. The cylindrical grinding wheels 27, 28 have grinding surfaces 27a, 28a, whose generatrices extend in parallel to the axes of the wheel spindles 25, 26 mounting the grinding wheels 27, 28, respectively. The cylindrical grinding wheels 27, 28 are attached on the wheel spindles 25, 26 so that a first plane S1 which extends normal to the grinding surfaces 27a, 28 includes the axis of the swivel shaft 22, as best shown in FIG. 1. Desirably, the grinding wheels 27, 28 are attached to the respective wheel spindles 25, 26 at such positions that the first plane S1 including the axis of the swivel shaft 22 crosses each of the grinding wheels 27, 28 at a mid portion in the axial direction of each grinding wheel 27, 28. In other words, the wheel spindles 25, 26 are configured to mount respective grinding wheels 27, 28 thereon at the positions where the respective grinding wheels 27, 28 and the swivel shaft 22 between the respective grinding wheels 27, 28 are in alignment with one another in the X-axis direction.

The swivel head 23 of the grinding wheel swivel device 20 takes a rectangular or square shape as viewed in a plan view of FIG. 1. Of four side surfaces of the swivel head 23, two opposite side surfaces 31 and 32 (hereafter referred to as first side surface 31 and second side surface 32) are respectively provided thereon with first and second grinding wheel support mechanisms 33, 34. Since these support mechanisms 33, 34 are basically the same in construction, description hereafter will be made regarding the construction of the first grinding wheel support mechanism 33 provided on the first side surface 31.

As shown in FIG. 1, a pair of bearing units 35, 36 are horizontally arranged on the first side surface 31 of the swivel head 23 with a predetermined space therebetween, and the wheel spindle 25 is supported by the bearing units 35, 36 at opposite ends thereof to be rotatable about a horizontal axis. When turned about the swivel shaft 22, the swivel head 23 is able to position the wheel spindle 25 to an angular position where the axis of the spindle head 25 becomes parallel to the rotational axis of the workpiece W.

Figure 3:
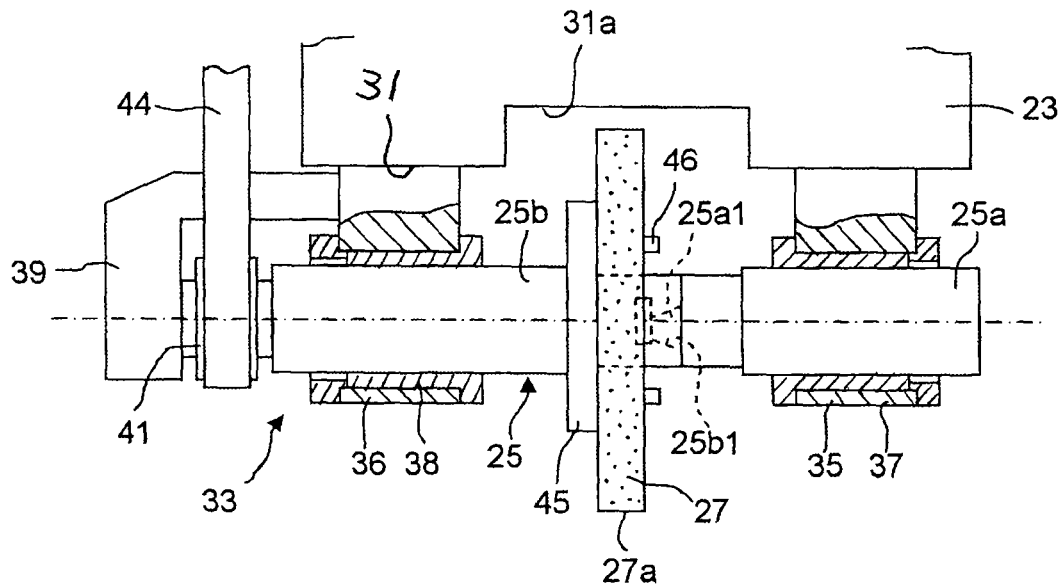
FIG. 3 is a plan view partly in section of a grinding wheel support mechanism.

As shown in FIG. 3 in detail, the wheel spindle 25 is constituted by two wheel spindle sections 25a, 25b which are able to be split and coupled at a mid portion in the axial direction of the wheel spindle 25. A radial bearing 37 provided in one of the bearing units 35 bears one of the wheel spindle sections 25a to be rotatable and axially slidable. Another radial bearing 38 and a thrust bearing 39 provided in the other bearing unit 36 bears the other wheel spindle section 25b to be rotatable only on the same axis as the one wheel spindle section 25a. A pulley 41 is attached to the other wheel spindle section 25b and is in driving connection with another pulley 43, which is attached to a motor spindle of a wheel drive motor 42 mounted on the swivel head 23, through one or several driving belts 44 constituting a belt transmission mechanism.

A tapered shaft 25a1 and a tapered hole 25b1 fittable on the tapered shaft 25a1 are respectively formed at the inner or facing ends of the two wheel spindle sections 25a, 25b. The two wheel spindle sections 25a, 25b are aligned and joined by two face bindings which include a taper fitting between the tapered shaft 25a1 and the tapered hole 25b1 and a face engagement at end surfaces of the two wheel spindle sections 25a, 25b. Usually, the tapered shaft 25a1 and the tapered hole 25b1 are bodily jointed by suitable coupling means (not shown) which is built in one of the facing ends of the two wheel spindle sections 25a, 25b. However, when the cylindrical grinding wheel 27 should be replaced by another or fresh grinding wheel, the jointing or coupling by the coupling means is released so that the wheel spindle section 25a can be separated from the wheel spindle section 25b by being axially moved. By utilizing a space which is made between the two wheel spindle sections 25a, 25b in separation, the cylindrical grinding wheel 27 held on the wheel spindle section 25b is removed therefrom, and another or fresh grinding wheel is attached to the wheel spindle section 25b.

One of the two wheel spindle sections 25b has a flange portion 45 at its inner end, and the grinding wheel 27 (or the fresh one) can be fitted on the wheel spindle section 25b and can be attached to the flange portion 45 by means of bolts 46. In the attached state, the grinding wheel 27 (or the fresh one) is held at such a position that the first plane S1 including the swivel center of the swivel head 23 (i.e., the axis of the swivel shaft 22) crosses each of the grinding wheels 27, 28 at a mid portion in the axial direction of each grinding wheel 27, 28.

By taking this arrangement, the swivel table 23 can be prevented from being subjected to the rotational moment about the swivel shaft 22 even when a grinding resistance acts on the cylindrical grinding wheel 27 during the grinding operation of the workpiece W.

A recessed portion 31a for the cylindrical grinding wheel 27 is formed on the first side surface 31 of the swivel head 23, and a rear part of the circumference of the cylindrical grinding wheel 27 enters the recessed portion 31a. By making the rear part of the circumference of the cylindrical grinding wheel 27 enter the recessed portion 31a, the distance from the first side surface 31 of the swivel head 23 to the axis of the wheel spindle 25 can be prevented from being elongated even in the use of the cylindrical grinding wheel 27 being large in diameter, so that the support rigidity of the wheel spindle 25 can be prevented from being lowered.

The aforementioned bearing units 35, 36, the wheel spindle 25 and the like constitute a first grinding wheel support mechanism 33.

A second grinding wheel support mechanism 34 which is provided on the second side surface 32 of the swivel head 23 also takes the same construction as the first support mechanism 33. The cylindrical grinding wheel 28 supported by the second grinding wheel support mechanism 34 is held at such a position that the first plane S1 including the swivel center of the swivel head 23 (i.e., the axis of the swivel shaft 22) crosses both of the grinding wheels 27, 28 at the centers in width direction of these grinding wheels 27, 28, so that the grinding wheels 27, 28 and the axis of the swivel shaft 22 are aligned to one another in a direction normal to the moving direction of the work table 12.

The wheel spindle 26 supported by the second grinding wheel support mechanism 34 is rotatable by another wheel drive motor 47 mounted on the swivel table 23, through another belt transmission mechanism 48.

In the present embodiment, the workpiece W is for example a camshaft having a plurality of re-entrant cams Wa each with a re-entrant portion formed at a part on the circumferential surface thereof and spaced in the axial direction thereof. The cylindrical grinding wheel 27 for roughly grinding the re-entrant cams Wa on the camshaft W is made to be large in diameter, whereas the grinding wheel 28 for finishing each of the re-entrant cams Wa to a predetermined profile is made to be small in diameter. The re-entrant cams Wa can be ground efficiently with two kinds of the large and small-diameter cylindrical grinding wheels 27, 28.

As shown in FIG. 2, a large-diameter cylindrical member 21a constituting a part of the support base 21 is fixed on the support base 21 of the grinding wheel swivel device 20 with the axis thereof extending vertically. The position of the large diameter cylindrical member 21a in the vertical direction is such that a second plane S2 (horizontal plane in this particular embodiment) including the rotational axes of the respective wheel spindles 25, 26 in the first and second grinding wheel support mechanism 33, 34 crosses the large-diameter cylindrical member 21a at about the mid portion in the vertical direction. The swivel shaft 22 is concentrically upright at a center portion of the large-diameter cylindrical member 21a. Further, a small-diameter cylindrical member 21b being upright is fixedly suspended downward from the ceiling portion of the swivel head 23 in concentric relation with the large-diameter cylindrical member 21a and fits on the swivel shaft 22.

Likewise, an intermediate cylindrical member 23a constituting a part of the swivel head 23 is fixedly suspected from the ceiling portion of the swivel head 23 in concentric relation with the large-diameter cylindrical member 21a and the small-diameter cylindrical member 21b and extends downward between the large-diameter cylindrical member 21a and the small-diameter cylindrical member 21b. An outer race of a cross roller bearing 51 is fixed on the top end surface of the large-diameter cylindrical member 21a in concentric relation with the same, while an inner race of the cross roller bearing 51 is fixed on the top end portion of the intermediate cylindrical member 23a fixed on the ceiling portion of the swivel head 23. Thus, the swivel head 23 is supported on the support base 21 to be turnable about the swivel shaft 22 through the cross roller bearing 51.

A first annular space portion 24a is formed between the internal surface of the large-diameter cylindrical member 21a and the external surface of the intermediate cylindrical member 23a and vertically extends across the aforementioned second plane S2 which is the horizontal plane including the axes of the wheel spindles 25, 26. That is, the first annular space portion 24a is at a position where it is divided by the second plane S2 at about a mid portion in the axial direction. Further, a second annular space portion 24b is formed between the external surface of the small-diameter cylindrical member 21b and the internal surface of the intermediate cylindrical member 23a and vertically extends across the second plane S2. A direct drive motor 52 is built in the first annular space portion 24a, and the swivel head 23 is drivingly rotatable by the direct drive motor 52. A brake unit 56 is built in the second annular space portion 24b and is able to clamp the swivel head 23 on the support base 21 when operated.

The direct drive motor 52 is composed of a rotor 53 fixedly fitted on the external surface of the intermediate cylindrical member 23a on the swivel head 23 side and a stator 54 fixedly fitted in the internal surface of the large-diameter cylindrical member 21a on the support base 21 side. In this arrangement, it is desirable that the centers in axial direction of the rotor 53 and the stator 54 (i.e., the driving center of the direct drive motor 53) should be arranged as close as possible to the second plane S2, that is, almost in alignment with the second plane S2. A plurality of plate-like permanent magnets are adhered to the external surface of the rotor 53, while a plurality of magnetic coils are arranged on the internal surface of the stator 54. Thus, when electric current is applied to the coils, magnetic fluxes generated thereby act on the permanent magnets, whereby the rotor 53 is turned together with the swivel head 23.

The swivel angle of the swivel head 23 which is turned upon rotation of the rotor 53 of the direct drive motor 52 is detected by an encoder 55, which is secured on the top end portion of the small-diameter cylindrical member 21b with its detection shaft secured to the support base 21 through a shaft (not numbered) passing through the swivel shaft 22. The swivel head 23 is stopped at any desired target angular position based on a detection signal from the encoder 55 and is secured or clamped by the brake unit 56 on the support base 21 at the target angular position.

The brake unit 56 of an annular form is composed of a stationary piston 57 fixed on the support base 21 around the small-diameter cylindrical member 21b fixed to the swivel head 23, a movable cylinder 58 fitted on the stationary piston 57 to be vertically slidable, and a friction disc 59 secured to the intermediate cylindrical member 23a to be rotatable bodily with the swivel head 23. The movable cylinder 58 is movable to press the friction disc 59 against a flange portion which radially inwardly protrudes from the lower end of the intermediate cylindrical member 23a, so that the swivel head 23 can be fixed or clamped on the support base 21.

In this way, by arranging the direct drive motor 52 as a swivel drive mechanism for turning the swivel head 23, in the first annular space portion 24a which is formed between the large-diameter cylindrical member 21a fixed on the support base 21 and the intermediate cylindrical member 23a fixed on the swivel head 23, it becomes possible to arrange the direct drive motor 52 at such a position that the axial center or driving center of the direct drive motor 52 is almost in alignment with the second plane S2 including the rotational axes of the respective wheel spindles 25, 26 of the grinding wheel support devices 33, 34. With this construction, it can be realized to drive the swivel head 23 at about the gravity center, to suppress the dimension in height of the swivel head 23 and to enhance the rigidity of the swivel head 23 against the rotational moment which acts during grinding operations.

Further, by arranging the brake unit 56 for clamping the swivel head 23, in the second annular space portion 24b which is formed between the small-diameter cylindrical member 21b and the intermediate cylindrical member 23a which are both secured to the swivel head 23, the brake unit 56 can be arranged to be overlapped with the direct drive motor 52 in the axial direction of the swivel shaft 22 for the swivel head 23. This advantageously prevents the swivel head 23 from being increased in height, despite the provision of the brake unit 56.

As a consequence, it can be suppressed that the swivel head 23 is inclined relative to the support base 21 due to the grinding resistance which acts on either the cylindrical grinding wheel 27 or the cylindrical grinding wheel 28 during a grinding operation, and therefore, the grinding accuracy of the workpiece W can be enhanced.

Referring back to FIG. 1, a truing device 68 with a truing tool 67 for truing the cylindrical grinding wheels 27, 28 is arranged on the work head 13 installed on the work table 12. With one of the wheel spindles 25 or 26 positioned in parallel to the Z-axis at the operator or front side (i.e., the lower side as viewed in FIG. 1) of the grinding machine 10, a truing infeed of the wheel head table 18 in the X-axis direction and a traverse feed of the work table 12 in the Z-axis direction are given in turn, so that the truing device 68 can true the grinding surface of the cylindrical grinding wheel 27 or 28 positioned on the front side of the grinding machine 10.

Figure 4:
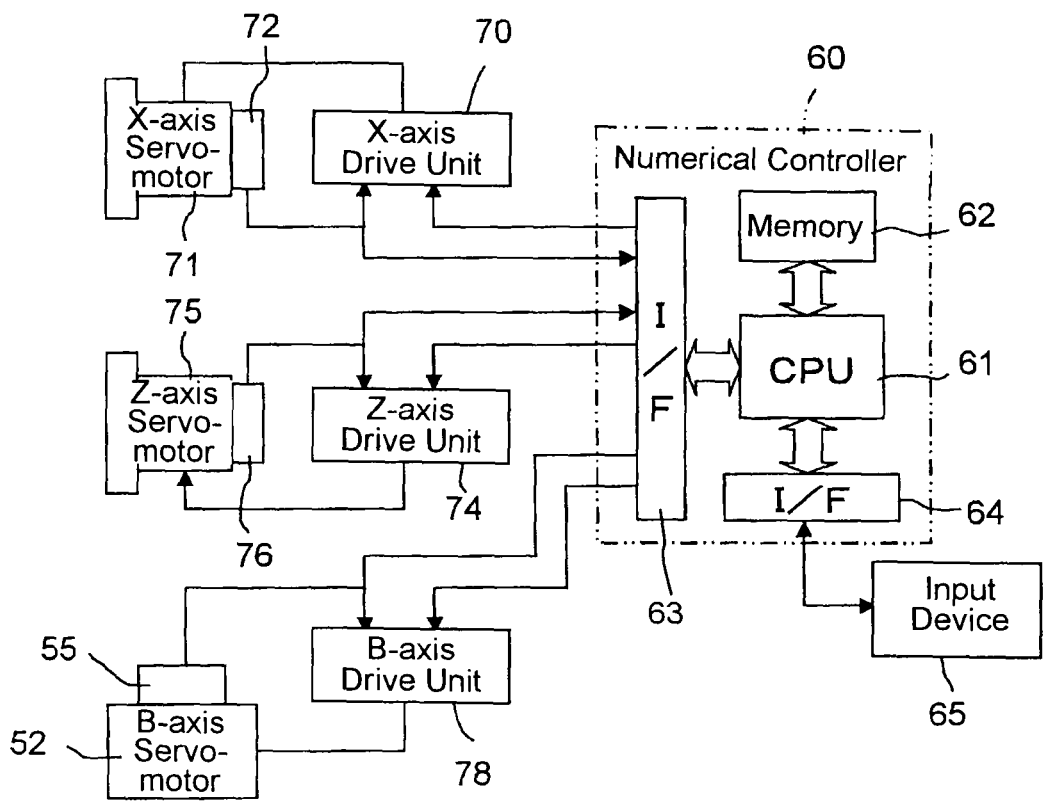
FIG. 4 is a block diagram showing a control system for the cylindrical grinding machine.

As shown in FIG. 4, a numerical controller 60 for controlling the cylindrical grinding machine 10 is mainly composed of a central processing unit 61, a memory 62 for storing various control values and programs and interfaces 63, 64. The memory 62 stores therein data and the like which are necessary for executing grinding cycles. The numerical controller 60 receives various data through an input device 65. The input device 65 is provided therein with a key board for inputting data and a display device for displaying data (both not shown).

The numerical controller 60 is configured to supply drive signals to the X-axis servomotor 71 which moves the grinding wheel table 18 in the X-axis direction, through an X-axis drive unit 70. An encoder 72 attached to the X-axis servomotor 71 is configured to deliver the rotational position of the X-axis servomotor 71, that is, the position in the X-axis direction of the grinding wheel table 18 to the X-axis servomotor drive unit 70 and the numerical controller 60. Further, the numerical controller 60 is configured to supply drive signals to the Z-axis servomotor 75 which moves the work table 12 in the Z-axis direction, through a Z-axis drive unit 74. An encoder 76 attached to the Z-axis servomotor 75 is configured to deliver the rotational position of the Z-axis servomotor 75, that is, the position in the Z-axis direction of the work table 12 to the Z-axis drive unit 74 and the numerical controller 60.

Further, the numerical controller 60 is configured to supply drive signals to the direct drive motor 52 which turns the swivel head 23 about the B-axis (i.e., the swivel shaft 22), through a B-axis drive unit 78. The encoder 55 which is secured on the top end portion of the small-diameter cylindrical member 21b with its detection shaft secured to the support base 21 as mentioned earlier is configured to deliver the rotational position of the direct drive motor 52, that is, the swivel position of the swivel head 23 to the B-axis drive unit 78 and the numerical controller 60.

Next, description will be made regarding the operation of the cylindrical grinding machine as constructed above. A grinding cycle start command for the camshaft W is commanded in the state that the cylindrical grinding wheel 27 for rough grinding is positioned about the B-axis to bring the wheel spindle 25 therefor into parallel relation with the Z-axis direction and that the work table 12 is positioned in the Z-axis direction to bring one portion (cam) Wa on the workpiece (camshaft) W to be machined into alignment with the cylindrical grinding wheel 27. In response to the grinding cycle start command, the wheel spindle 25 is drivingly rotated by the wheel drive motor 42, and the workpiece W whose opposite ends are supported by the centers 15, 16 of the work head 13 and the foot stock 14 are drivingly rotated by the work spindle drive motor 17.

Then, the grinding wheel table 18 is advanced by the X-axis servomotor 71 in the X-axis direction, and the portion Wa to be machined on the workpiece W is roughly ground with the cylindrical grinding wheel 27 for rough grinding in a plunge grinding mode. Upon completion of the rough grinding on the portion Wa, the grinding wheel table 18 is retracted by the X-axis servomotor 71 in the X-axis direction, and the work table 12 is indexed by the Z-axis servomotor 75 a predetermined distance in the Z-axis direction, so that another or second portion Wa to be machined next is positioned to a position where it faces the cylindrical grinding wheel 27. In this state, the grinding wheel table 18 is advanced again by the X-axis servomotor 71 in the X-axis direction, whereby the second portion Wa to be machined next is roughly ground with the cylindrical grinding wheel 27 for rough grinding in the plunge grinding mode. Other portions Wa on the workpiece W are roughly ground in the same manner as described above.

While each of the portions Wa on the workpiece W is roughly ground in the plunge grinding mode, a grinding resistance acts on the cylindrical grinding wheel 27 for rough grinding. In the present embodiment, as mentioned earlier, the swivel drive mechanism (i.e., direct drive motor 52) for turning the swivel table 23 is arranged to place the driving center thereof about in alignment with the second plane S2 including the rotational axes of the respective wheel spindles 25, 26 in the grinding wheel support devices 33, 34. In other words, the driving center of the direct drive motor 52 is placed at almost the same height as the wheel spindles 25, 26 for the cylindrical grinding wheels 27, 28. With this construction, the height of the swivel head 23 can be suppressed to be low, so that it becomes possible to suppress the inclination of the swivel head 23 due to the grinding resistance during the grinding operation.

Further, in the present embodiment, since the grinding resistance acting on the cylindrical grinding wheel 27 for rough grinding is oriented toward the axis of the swivel shaft 22, the swivel head 23 is not subjected to the rotational moment which the grinding resistance generates to turn the swivel head 23 about the swivel shaft 22. Thus, in order to clamp the swivel head 23, the brake unit 56 is not necessarily needed, and instead, the swivel head 23 can be clamped by utilizing a servo-lock function of the direct drive motor 52.

However, it should be regarded not as an essential requirement to the present invention but as a favorable feature of the present invention to take the construction wherein the grinding resistance does not generate the rotational moment acting on the swivel head 23 about the swivel shaft 22 by orienting the grinding resistance acting on the cylindrical grinding wheel 27 or 28 toward the axis of the swivel shaft 22 during the grinding operation.

When the rough grindings on all of the portions Wa to be ground of the workpiece W are completed by the retraction of the grinding wheel table 18 to the retracted position in the X-axis direction, a command is outputted from the numerical controller 60, in response to which the swivel head 23 on the grinding wheel table 18 is turned by the direct drive motor 52 through an angle of 180 degrees about the B-axis (swivel shaft 22), whereby the wheel spindle 26 which mounts the cylindrical grinding wheel 28 for finish grinding in the grinding wheel swivel device 20 is positioned to an angular position where it becomes parallel to the rotational axis of the workpiece W. In this state, the swivel head 23 is clamped by the brake unit 56 on the support base 21.

Then, the grinding wheel table 18 is advanced by the X-axis servomotor 71 in the X-axis direction, whereby one portion Wa to be machined of the workpiece W is ground to be finished. The finish grinding operation like this is repeated for each of other portions Wa to be machined of the workpiece W which is selectively positioned before the cylindrical grinding wheel 28 for finish grinding. Thus, all of the portions Wa to be machined of the workpiece W are successively ground to be finished with the cylindrical grinding wheel 28 for finish grinding. In this way, the grinding of the workpiece W is completed.

In the foregoing embodiment, description has been made taking as example the cylindrical grinding machine 10 wherein the grinding wheel support mechanisms 33, 34 which rotatably support the cylindrical grinding wheels 27, 28 through the wheel spindles 25, 26 are arranged on the side surfaces 31, 32 of the swivel head 23. However, the present invention is not necessarily limited to grinding machines. For example, the present invention is applicable to a turning machine wherein a plurality of tools for turning crankshafts or camshafts are provided on a turnable tool head.

In the foregoing embodiment, description has been made taking as example the cylindrical grinding machine wherein the grinding wheel support mechanisms 33, 34 which rotatably support the two cylindrical grinding wheels 27, 28 through the wheel spindles 25, 26 are arranged on the swivel head 23 of the grinding wheel swivel device 20. However, the number of the cylindrical grinding wheels arranged on the swivel head 23 are not necessarily required to be two, but may be other plural number than two. Further, the cylindrical grinding wheels are not limited to the straight cylindrical grinding wheels 27, 28 wherein the generatrix of the grinding surface of each grinding wheel extends in parallel to the rotational axis therefor. At least one of the grinding wheels 27, 28 may be an angled cylindrical grinding wheel wherein the generatrix of a grinding surface thereof is inclined relative to the rotational axis.

Further, in the foregoing embodiment, each of the wheel spindles 25, 26 with the respective cylindrical grinding wheels 27, 28 attached thereon is supported at opposite end portions thereof in order to enhance the supporting rigidity of each cylindrical grinding wheel, and each of the wheel spindles 25, 26 is configured to be selectively split and coupled in order to make the replacement of each grinding wheel easy. However, the opposite end supporting construction for each wheel spindle and the splitable construction of each grinding wheel are not essential requirements for the present invention. For example, modifications may be made to support each grinding wheel on one end of each wheel spindle or to perform the replacement of each grinding wheel together with the wheel spindle which mounts each grinding wheel thereon.

Various features and many of the attendant advantages in the foregoing embodiment will be summarized as follows:

In the foregoing embodiment typically shown in FIG. 2, since the annular space portion 24b between the support base 21 and the swivel head 23 is formed to cross the second plane S2 at about the axial mid portion thereof, and since the direct drive motor 52 for driving the swivel head 23 is built in the annular space portion 24a, the height of the swivel head 23 relative to the support base 21 can be suppressed, so that the swivel head 23 can be restrained from being inclined by the machining reaction force which is generated during a machining operation with the tool 27, 28 on each tool spindle 25, 26.

Also in the foregoing embodiment typically shown in FIG. 2, since the tool spindles 25, 26 are wheel spindles each mounting a cylindrical grinding wheel 27, 28 thereon to be rotatable together, the swivel head 23 supporting the wheel spindles 25, 26 can be restrained from being inclined due to the grinding resistance which is generated during a machining operation with each of the grinding wheels 27, 28, so that the grinding accuracy of the workpiece W can be enhanced.

Also in the foregoing embodiment typically shown in FIG. 2, since the brake unit 56 is provided for clamping the swivel head 23 on the support base 21, it can be realized to reliably clamp the swivel head 23 at any predetermined angular position.

Also in the foregoing embodiment typically shown in FIG. 2, since the direct drive motor 52 comprises the rotor 53 rotatable bodily with the swivel head 23 and the stator 54 fixed on the support base 21, and since the direct drive motor 52 is arranged so that the second plane S2 extends across about the centers in the axial direction of the rotor 53 and the stator 54, it becomes possible to drive the swivel head 23 at around the gravity center of the swivel head 23 and also to suppress the height of the swivel head 23.

Also in the foregoing embodiment typically shown in FIG. 2, since the brake unit 56 is arranged in the annular space portion 24b formed between the internal surface of the intermediate cylindrical member 23a and the swivel shaft 23 while the direct drive motor 53 is built in the annular space portion 24a formed between the internal surface of the large-diameter cylindrical member 21a and the external surface of the intermediate cylindrical member 23a, it becomes possible to arrange the direct drive motor 53 and the brake unit 56 coaxially in an overlapping relation, so that the swivel device 20 can be prevented from being increased in height by the provision of the brake unit 56.

Also in the foregoing embodiment typically shown in FIG. 2, the tool spindles 25, 26 are wheel spindles arranged at opposite end surfaces of the swivel head 23 and extending in parallel relation in the horizontal plane S2 and are configured to mount respective grinding wheels 27, 28 thereon at such positions that the vertical plane S1 including the axis of the swivel shaft 22 crosses each of the grinding wheels 27, 28 at a mid portion in the axial direction of each grinding wheel 27, 28. Thus, the grinding resistance which acts on the grinding wheel 27, 28 during a grinding operation is oriented radially of the swivel shaft 22 not to apply a rotational moment to the swivel head 23, and therefore, the swivel head 23 is rigid against the grinding resistance, so that the grinding accuracy of the workpiece can be enhanced.

In the foregoing embodiment typically shown in FIG. 1, since the grinding machine 10 is provided with the swivel device 20 having any one of the characters set forth above, the grinding machine 10 can have the same effects as achieved by the swivel device 20.

Obviously, numerous modifications and variations of the present invention are possible in light of the above teachings. It is therefore to be understood that within the scope of the appended claims, the present invention may be practiced otherwise than as specifically described herein.

What is claimed is:
1. A grinding machine comprising:
a bed;
a work table horizontally movable on the bed in a first direction;
a workpiece drive and support mechanism mounted on the work table for supporting a workpiece to be rotatable about an axis extending in the first direction;

a first feed mechanism for feeding the work table on the bed in the first direction;

a grinding wheel table horizontally movable on the bed in a second direction intersecting with the first direction;

a swivel device mounted on the grinding wheel table, the swivel device comprising a support base, a swivel head arranged on the support base to be turnable about a swivel shaft and having a plurality of tool spindles, wherein axes of the plurality of tool spindles are arranged in a single plane and wherein the single plane extends perpendicular to the axis of the swivel shaft, the swivel device further comprising an annular space portion formed between the support base and the swivel head in coaxial relation with the swivel shaft, wherein the single plane perpendicular to the axis of the swivel shaft crosses the annular space portion at about a mid portion of the annular space portion in the axial direction of the swivel shaft, and a direct drive motor comprising a rotor and a stator being built in the annular space portion for driving the swivel head to turn about the swivel shaft, the direct drive motor being arranged so that the plane perpendicular to the axis of the swivel shaft extends across about the centers of the rotor and the stator in the axial direction of the swivel shaft, wherein the support base is fixed on the grinding wheel table and wherein the swivel shaft extends vertically so that the swivel head is horizontally turnable about the swivel shaft;

a second feed mechanism for feeding the grinding wheel table in the second direction; and first and second wheel spindle support mechanisms provided on first and second side surfaces of the swivel head and respectively supporting the tool spindles with first and second grinding wheels mounted on the tool spindles being rotatable about respective axes of the tool spindles in the single plane perpendicular to the axis of the swivel shaft.

2. The grinding machine as set forth in claim 1, wherein:
the rotor is rotatable bodily with the swivel head and the stator is fixed on the support base.

3. The grinding machine as set forth in claim 2, wherein:
the first and second side surfaces of the swivel head are opposite to each other with the swivel shaft therebetween so that the first and second grinding wheels mounted on the tool spindles are rotatable about the respective axes in the plane perpendicular to the axis of the swivel shaft; and the tool spindles are configured to respectively mount the first and second grinding wheels thereon at such positions that a vertical plane including the axis of the swivel shaft crosses each of the first and second grinding wheels at a mid portion in the axial direction of each grinding wheel.

4. The grinding machine as set forth in claim 3, further comprising:

a first cylindrical member fixedly provided on the support base coaxially with the swivel shaft to constitute a part of the support base;

a second cylindrical member fixedly provided on the swivel head inside the first cylindrical member and around the swivel shaft coaxially of the first cylindrical member and the swivel shaft to constitute a part of the swivel head; and a brake unit arranged in an annular space portion formed between the internal surface of the second cylindrical member and the swivel shaft for selectively clamping the swivel head on the support base; and wherein:

the annular space portion between the support base and the swivel head is formed between an internal surface of the first cylindrical member and an external surface of the second cylindrical member; and the direct drive motor is built in the annular space portion formed between the internal surface of the first cylindrical member and the external surface of the second cylindrical member in an overlapping relation with the brake unit.

5. The grinding machine as set forth in claim 4, wherein:
the workpiece is a camshaft having at least one re-entrant cam portion thereon; and the first and second grinding wheels are respectively a large-diameter grinding wheel and a small-diameter grinding wheel for respectively roughing and finishing the at least one re-entrant cam portion of the camshaft.

* * * * *